(12) United States Patent
Resh

(10) Patent No.: US 6,302,277 B1
(45) Date of Patent: *Oct. 16, 2001

(54) SWIMMING POOL CLEANING TOOL

(75) Inventor: Eric Resh, 44641 Alighchi Way, Temecula, CA (US) 92592

(73) Assignee: Eric Resh, Temecula, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/964,312

(22) Filed: Nov. 4, 1997

Related U.S. Application Data

(63) Continuation-in-part of application No. 08/570,234, filed on Dec. 11, 1995, which is a continuation of application No. 08/296,226, filed on Aug. 25, 1994, now Pat. No. 5,473,786.

(51) Int. Cl.[7] ............................. B01D 35/00; E04H 4/16
(52) U.S. Cl. ........................ 210/471; 210/495; 210/499; 15/1.7
(58) Field of Search ..................... 210/238, 470, 210/471, 495, 499; 55/378, 381; 15/1.7; 43/11

(56) References Cited

U.S. PATENT DOCUMENTS

| | | |
|---|---|---|
| D. 311,796 | 10/1990 | Collins . |
| 2,205,706 | 6/1940 | Wolff .................................. 210/161 |
| 2,420,087 | 5/1947 | Meek ...................................... 43/11 |
| 2,464,921 | 3/1949 | Chandler ............................. 210/471 |
| 2,486,163 | 10/1949 | Jennings et al. ........................ 43/11 |
| 2,853,195 | 9/1958 | Malcolm ............................. 210/471 |
| 2,867,331 | 1/1959 | Bader .................................. 210/471 |
| 2,939,238 | 6/1960 | Ertel et al. .............................. 43/11 |
| 3,188,668 | 6/1965 | Buckelew ............................. 15/1.7 |

(List continued on next page.)

FOREIGN PATENT DOCUMENTS

477632 * 10/1951 (CA) .................................. 210/471

OTHER PUBLICATIONS

Facsimile of a Photocopy of a Cross–Section of "Pools Pals Rake With Wide Pocket", purchased approximately Aug. 1995.
Blue Devil, "Setting a Standard for Quality", 4 pages.
Purity Pool, "New Specialty Rakes from Purity Pool", 2 pages.
Purity Pool, "What's It All About?", 2 pages.
T & K Pool Products Mfg, "Installation Instructions", 1 page.
Aquatic Products Company, "Aquapro".

*Primary Examiner*—Matthew O. Savage
(74) *Attorney, Agent, or Firm*—J. Mark Holland

(57) ABSTRACT

A tool for cleaning debris from swimming pools includes a flame, a corresponding net, and retaining means for retaining the net on the frame. The preferred retaining means is an elongated strip of resilient, flexible material, having a generally U-shaped cross-section. The web portion of the cross-section includes an exterior surface smoothly shaped between its two edges to urge debris from the pool into the net. The leg portions of the cross-section include gripping portions to assist in engaging and/or disengaging the retaining means from the frame, to permit the net to be assembled, changed or replaced. The preferred frame of the tool is fabricated from metal and includes an elongated, curved frame portion with its ends welded to a tubular attachment member, to permit attachment of the tool to a handle, pole or similar structure. The preferred net of the tool includes one or more anti-slip devices to prevent the edge of the net or bag from slipping between the frame portion and retaining means. A corresponding preferred method of use is also disclosed.

12 Claims, 8 Drawing Sheets

U.S. PATENT DOCUMENTS

| | | | |
|---|---|---|---|
| 3,220,037 | 11/1965 | Ruhling | 15/1.7 |
| 3,688,483 | 9/1972 | Hamilton | 56/400.11 |
| 3,863,237 | 1/1975 | Doerr | 15/1.7 |
| 3,962,758 | 6/1976 | Knappe et al. | 24/255 |
| 3,979,146 | 9/1976 | Berg | 15/1.7 |
| 4,003,100 * | 1/1977 | Whitaker | 15/1.7 |
| 4,034,710 | 7/1977 | Carter | 43/11 |
| 4,152,801 | 5/1979 | Lieber | 15/1.7 |
| 4,169,331 | 10/1979 | Baker | 15/1.7 |
| 4,176,419 | 12/1979 | MacDonald | 15/1.7 |
| 4,198,720 | 4/1980 | Matsumoto | 15/1.7 |
| 4,225,437 | 9/1980 | Woodward | 15/1.7 |
| 4,481,117 * | 11/1984 | Collins | 210/238 |
| 4,545,833 * | 10/1985 | Tafara | 156/93 |
| 4,846,972 | 7/1989 | Anderson | 15/1.7 |
| 4,880,531 | 11/1989 | Blake et al. | 15/1.7 |
| 4,994,178 | 2/1991 | Brooks | 15/1.7 |
| 5,137,623 | 8/1992 | Wall et al. | 15/1.7 |
| 5,473,786 * | 12/1995 | Resh | 15/1.7 |

* cited by examiner

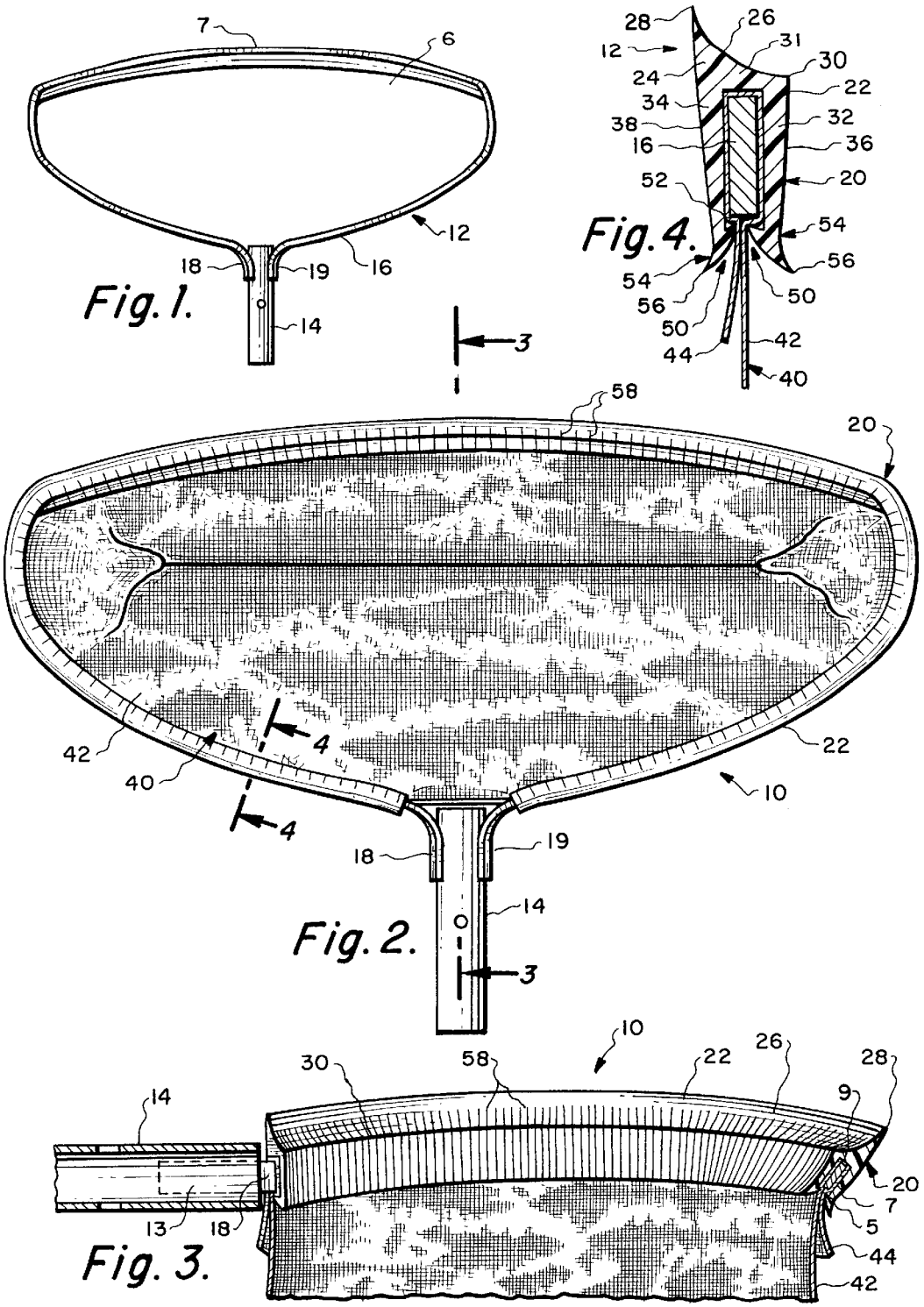

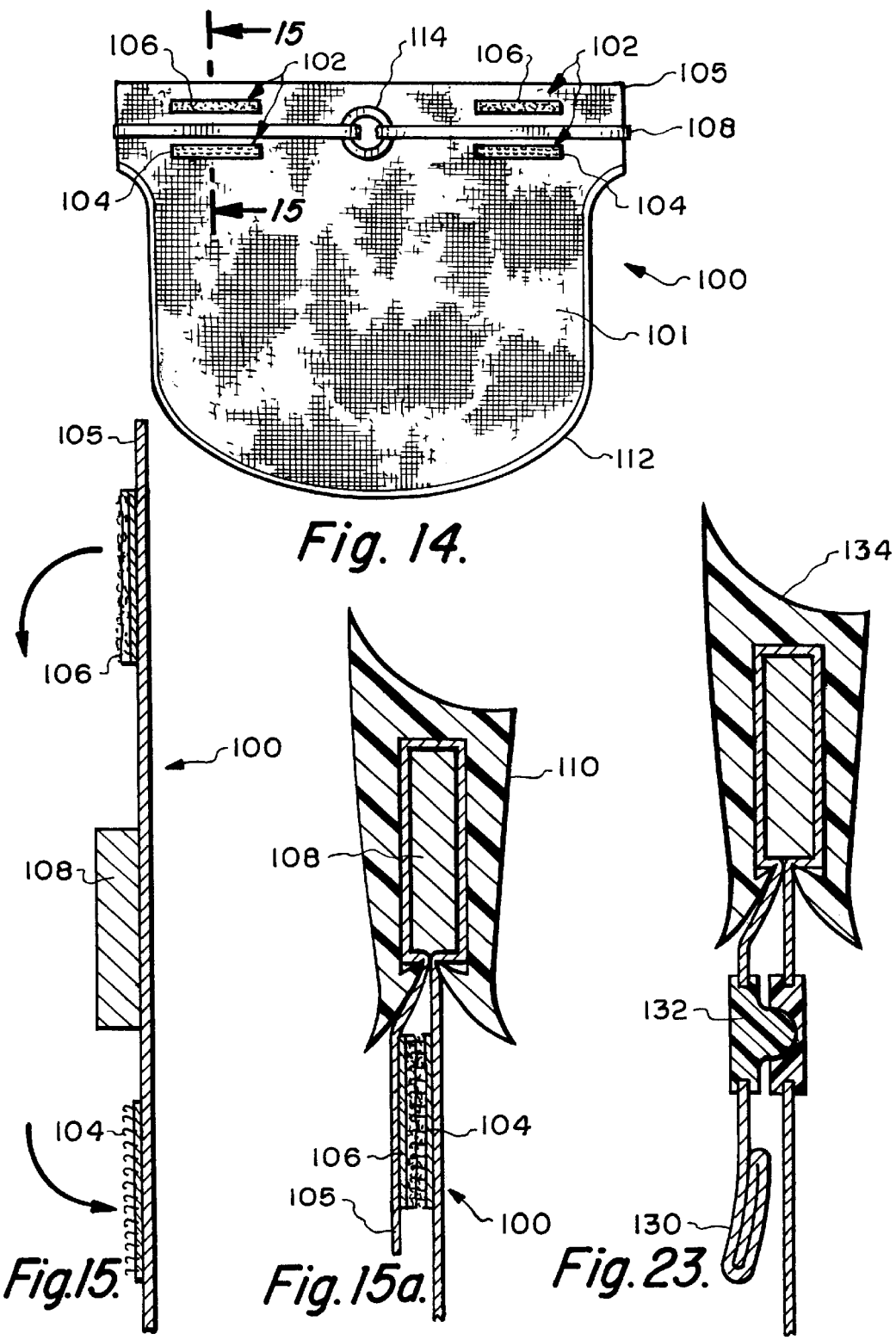

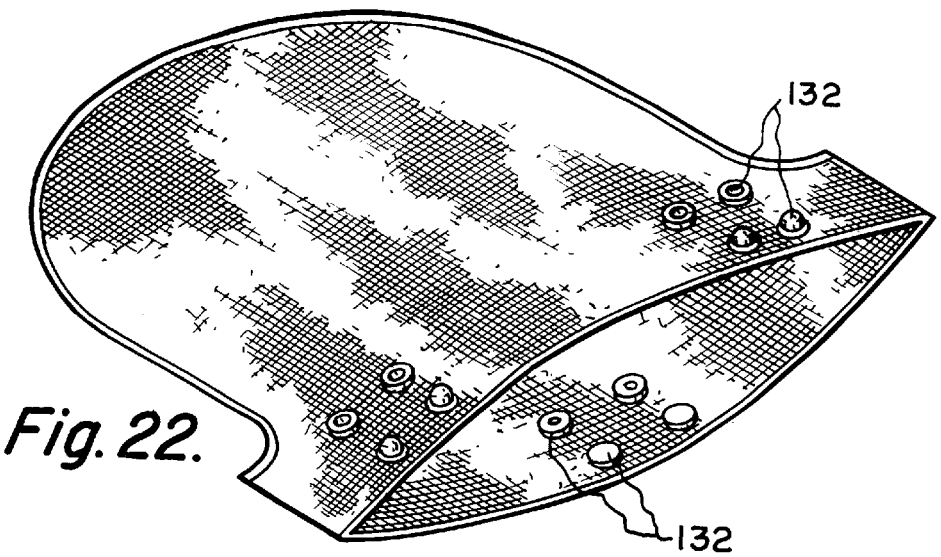
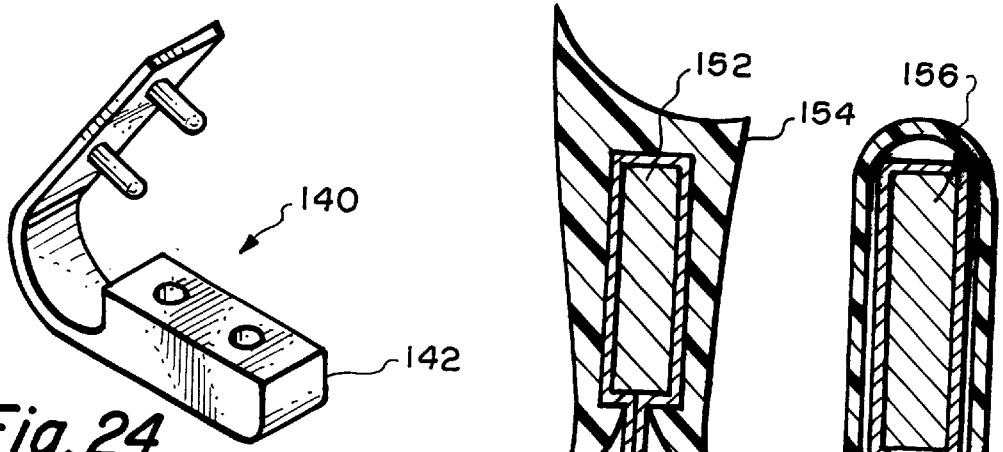
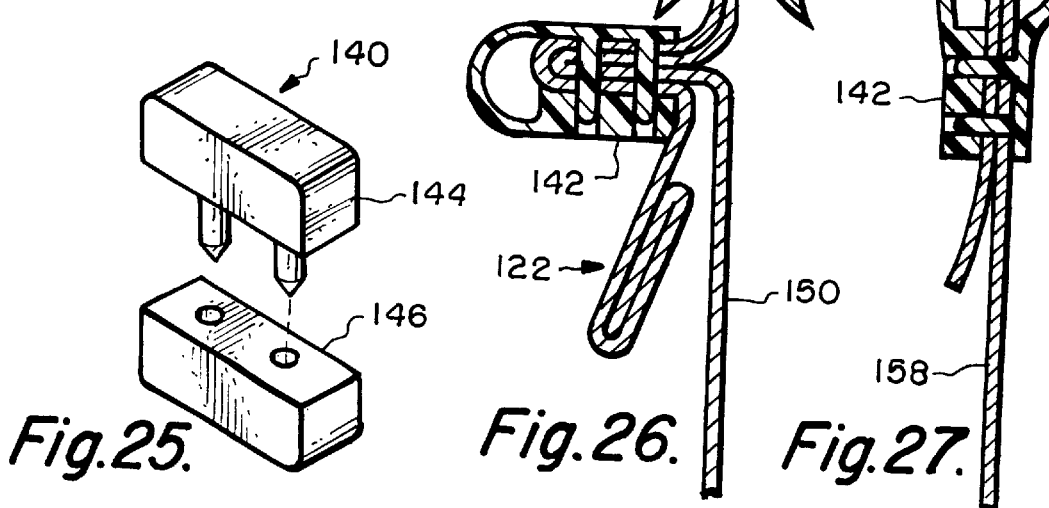

SWIMMING POOL CLEANING TOOL

This is a continuation-in-part of application Ser. No. 08/570,234, filed Dec. 11, 1995, still pending, which is a continuation of application Ser. No. 08/296,226, filed Aug. 25, 1994, now U.S. Pat. No. 5,473,786.

BACKGROUND OF THE INVENTION

This invention relates to swimming pool cleaning devices generally, and more specifically to an improved tool to remove debris from a swimming pool utilizing a frame with a net retained thereon by a retaining member.

Prior art devices, sometimes called "pool rakes", "leaf rakes", or "pool nets", are used to skim, scoop, or otherwise remove, debris from swimming pools. Some parts of the rake tend to wear out. Especially vulnerable to wear is the "bag" or net component of the rake into which leaves and other debris are trapped as the rake is used to clean a swimming pool. After repeated or continued use, the bag may wear through at certain spots, may develop holes, the bag's stitching may break, or it otherwise fails. As a consequence, the bag typically is unable to remove, or is at least less effective in removing, debris from a pool. The bag needs to be replaced.

Some prior art assemblies are monolithic, in that they are designed for the entire assembly (the frame, net, etc.) to be discarded when the bag is damaged. This precludes separate replacement of the bag or other components.

Some prior art bags include multiple layers of bag material (at least on certain portions of the bag) which may help delay the bag's failure. For example. if a "wear spot" is a seam on the bag, an additional fabric layer at that location may postpone the "wear-through" at that location. Such bags also sometimes include combinations of various fabrics (some having finer meshes than others) which, like the multiple layer bags, can also help to trap "fine" particles from the water during cleaning. Even such "reinforced" bags, however, eventually tend to wear out.

To facilitate the needed bag replacement, as well as replacement of other parts which may become damaged or worn, some prior art devices are modular, and typically include a replaceable net sized and configured to fit a frame, a replaceable elongated clip to hold the net to the frame, and attachment means to attach the frame to a handle or pole. Any of these modular components (including the net, as mentioned above, as well as the elongated clip and/or the frame) can wear out or break while there is still useful life in one or more of the other components. Depending on the application, the user, and the design and manufacture of the device (among other factors), one or the other of the components can be more likely to wear out before the others.

Prior art attempts to permit modular assembly and/or replacement of parts have been less than satisfactory. Among other things, the prior art devices of which this inventor is aware do not permit ready assembly or removal of the elongated clip from the frame.

These prior art devices are typically designed so that many, if not most, components of the rake are not readily disassembled by the user (even though the devices may be intended to be disassemblable by the user, they may be difficult to do so). An elongated channel-shaped retaining means is commonly used to hold the edges of the fabric at the mouth portion of the bag around the frame means. The retaining means pinches the bag fabric and the frame means together and thereby holds the bag in place about the mouth of the frame.

This approach is not entirely practical nor consistently effective. Among other things, this type of assembly is most effective with the seams of the bag oriented so that the shape of the bag's "mouth" matches the frame. The seams are thus balanced in position on either side of the frame, which helps prevent unusual wear and awkwardness in using the tool. Many prior art nets of this type do not provide any easy way to orient the seam properly.

Furthermore, a typical retaining means in these modular assemblies tends to pinch more tightly around curved or bent portions of the frame and less tightly along straight portions of the frame and/or near the ends of the retaining means. As a result, sufficient debris or other objects caught in the bag can easily tug the bag so that the ends of the bag fabric will slip from between the frame means and the retaining means (such as a channel) at various points. The bag thus becomes at least partially disengaged from the frame.

This is an irritating inconvenience for the user since the efficiency of the rake is at least somewhat reduced by the bag slippage, and since further use typically requires disassembly and reassembly of the tool. Some devices, such as Purity leaf rakes, attempt to address this problem by providing a protruding portion located on an interior surface of the channel-shaped retaining means and a correspondingly sized and positioned groove or cavity in the frame means. These elements cooperatively interfit with the bag edge between them and thereby provide an extra measure of gripping to attempt to reduce or prevent the bag from slipping between the frame means and the retaining means. This is not always an effective solution, and in any case can increase the effort required to remove the retaining means during replacement of the net.

Some devices, such as the Aquality Gold Line Leaf Rake, additionally utilize rivets set through the retaining means, bag, and frame means in order to prevent the bag edge from slipping out of engagement with the frame. Consequently, the bag cannot be replaced without replacing the entire assembly.

As indicated above, other aspects of the bag replacement process are affected by the approach used. In certain circumstances and for certain prior art devices and assemblies, removal of the retaining means may be so difficult that a screwdriver or other implement is required to accomplish the removal of the retaining means from the frame means so that the bag may be replaced, by prying the clip from the frame. Sometimes this removal is so awkward or difficult that the net, the frame, and/or the clip itself can be further damaged or destroyed during the operation, or the user's hands can be injured.

In addition, although some prior art clips are assertedly shaped to assist in scooping up debris, their actual shape does not provide a smooth, uninterrupted ramping surface to urge the debris into the net.

As indicated above, in certain other prior art devices, including devices made by AquaPro and T&K, replacing the fabric bag requires that most or all of the components of the pool rake be completely disassembled so that the frame means of the tool can be slipped through a loop formed on the edge of the bag. This loop is usually formed by folding back the edge of the fabric which is at the mouth portion of the bag upon itself, then permanently sewing that edge to the side of the bag to create a pocket or loop through which the frame means may be fed. One or more openings in the loop, such as at the ends of the loop, allow the end or ends of the frame means to enter the loop. Typically, after the bag is completely slipped around the frame, both ends of the frame can be reassembled with the remaining components of the rake (in a manner that permits future disassembly and reassembly of those frame ends, for future bag replacement, etc.). Thus, the loop is the means by which the bag hangs on the frame. Although elongated channel-shaped retaining means are sometimes used with such prior art devices, such channels still suffer from the problems and shortcomings discussed herein. Among other things, changing a bag on a tool of this sort (especially one having a prior art elongated channel-shaped retaining means) is inconvenient because it is both time consuming and often difficult to accomplish.

Additionally, many prior art tools of this type are not adequately designed to withstand the forces that can be generated from normal use, and therefore break at the neck of the attachment to the handle or pole. This can result in catastrophic failure of the tool requiring replacement of the frame member, damage to the net, and related problems and costs.

Moreover, no prior art of which this inventor is aware has combined the potential economies of scale, manufacturing cost savings, durability, and other benefits of a permanently "looped-on" bag (e.g., a bag with a loop through which the frame is fed, after which the ends of the frame are permanently affixed to an attachment member, thereby precluding replacement of the bag) with a replacable, elongated channel-shaped retaining means and permanently affixed frame ends (such as permanently affixed to an attachment member).

OBJECTS AND ADVANTAGES OF THE INVENTION

It is, therefore, an object of my invention to provide an improved replaceable bag for use with a leaf rake, for filtering material from a swimming pool. The bag includes a body portion through which pool water flows but particulate materials are trapped. In the preferred embodiment, the body portion includes an edge configured to overlay a frame used to manipulate the bag through the pool water. The edge is positioned between the frame and a retaining clip, and includes anti-slip means to assist in retaining the bag in operative relationship with the frame.

Examples of such anti-slip means include, by way of example and not by way of limitation, Velcro™-type fasteners or snaps to "loop" the edge around the frame, thickened positions at the bag edge (such as may be formed by folding the edge upon itself and sewing it together, molding plastic or rubber or similar material on the edge, or similar expedient), or the like. The anti-slip means may be provided in a wide variety of forms and combinations, including, without limitation, being located at one or more discrete locations about the edge, in a continuous or substantially continuous pattern (such as a line) near the edge, and in a combination of different types of devices (such as snaps, Velcro, and/or rubber portions) all on the same bag.

Another object of my invention is the provision of an improved bag and frame assembly, in which anti-slip means assist in retaining the bag in operative relationship with the frame. Among other things, the benefits of certain types of clip-on retaining means (such as illustrated in FIG. 4 herein) can be provided to a wide variety of frame and net assemblies. In addition, even a conventional bag with a loop sewn or formed at its edge can have the frame fed through the loop (as is commonly done in certain prior art assemblies), and the frame ends can be permanently affixed to an attachment means (such as by a conventional press-fit plug, gluing, bonding, or similar expedient) to improve durability and/or reduce manufacturing costs, and then have the clip-on retaining means assembled over the "looped" net and frame.

A further object of my invention is the provision of apparatus for cleaning debris from swimming pools, including a frame member forming an opening, and a replaceable bag configured and dimensioned to cover the opening. Preferably, the bag includes an edge adjacent the opening and the bag has a portion near the edge which contacts the frame member. For ready assembly and replacement, the edge is passed over the flame and folded back toward the bag (rather than having a permanent loop "fed" onto and surrounding the frame). A removable gripping member is configured and dimensioned to engage the frame member with the contacting bag portion positioned between the gripping member and the frame member. At least one anti-slip member is provided separate from the gripping member, the anti-slip member acting at or adjacent the bag edge to help prevent the edge from slipping between the gripping member and the frame member.

The removable gripping member can include an elongated channel member, one or more clip elements, or similar expedient. The anti-slip member can include, without limitation, one or more "hook and loop" type fasteners, material bonded to the edge to form a thickened portion, a portion formed by sewing the folded or rolled edge of the bag, or similar expedient, or a combination of two or more of the foregoing. The anti-slip member can be provided in one or more discrete locations about the edge, in substantially continuous bands around the edge of the bag, or in some combination thereof. The anti-slip members can be permanently attached to the bag (so that they stay on the bag prior to using the bag and after the useful life of the bag), or can be temporarily attached to the bag at the time of assembling the net to the frame. The anti-slip member can include at least one clamping fastener positioned around the bag where the bag overlays the frame member but not around the removable gripping member. Alternatively, the clamping fastener or fasteners can also enwrap the removable gripping member (as well as the bag overlaying the frame).

Still another object of the invention is the provision of apparatus for cleaning debris from swimming pools, including a frame member forming an opening, a removable bag configured and dimensioned to cover the opening (in which the bag has an edge adjacent the opening), and means for selectively or temporarily affixing some or all of the bag edge to an adjacent portion or portions of the bag to help retain the bag in position over the opening.

An additional object of my invention is the provision of a tool for cleaning debris from swimming pools, the tool including frame means having a central opening covered by a removable net having an edge, and a retaining device for temporarily retaining the net on the frame means, in which the net includes extra or different layers of fabric sewn in selected areas (to, as indicated above, prolong the bag's life, enable finer-mesh filtering, or the like), and the net includes at least one anti-slip device attached to its edge to prevent the edge from slipping between the retaining means and the frame means. The frame means and the attachment means may be permanently or temporarily affixed to each other.

Yet another object of the invention is the provision of a method of assembling a swimming pool rake, including the steps of providing a frame member having an opening therein, providing a retaining clip for retaining a bag member over the opening, providing a bag member configured and dimensioned to cover the opening, the bag member including at least one anti-slip portion to help retain the bag member in operative relationship with the frame member, and assembling the bag member to the frame member by passing the edge of the bag member around the frame and back toward the bag member.

The method can be beneficially utilized where the anti-slip portion includes at least one pair of cooperating hook-and-loop elements spaced from each other, and the assembling step includes fastening the cooperating hook-and-loop elements to loop the bag around the frame. Similar benefits are attained for pairs of cooperating snap elements in place of, or in addition to, the aforementioned hook-and-loop elements. Likewise, the anti-slip portion may beneficially include a thickened portion formed at the edge of the bag.

Another object of the invention is the provision of a swimming pool leaf rake apparatus, including a bag having a permanent loop formed at the edge thereof, the loop being assembled around a frame, where the frame ends are permanently affixed to an attachment means (such as by a conventional press-fit plug, gluing, bonding, or similar expedient), and an elongated retaining strip enwrapping the frame and the bag loop.

A still further object of my invention is to provide an improved replaceable bag to be used with leaf rakes of all types. In the preferred embodiment, the bag includes devices attached to it to prevent the edges of the fabric from slipping between a retaining means and the frame means used to manipulate the net through the pool water. These "anti-slip" devices are preferably made of Velcro, snaps or other similar two-part fastening means. Velcro-type fabrics consist of two types of fabric, one type having fiber hooks and the other type having fiber loops. The hooks and loops engage each other when pressed together, and separate from each other when pulled apart with some force. A strip or portion of one type of clinging fabric (e.g. hook) is preferably situated along the edge of the mouth portion of the bag and a corresponding strip or portion of the other type of clinging fabric (i.e. loop) is correspondingly situated parallel to the first type of fabric. The two portions are preferably spaced a sufficient distance from each other so that fabric between them can enwrap a portion of the frame means and be temporarily held by the hook and loop members in a folded position about the frame (after the two strips of clinging fabric are pressed together).

Retaining means such as U-shaped channels typically pinch harder in some places of the frame than others (for example, bent areas of the frame are typically gripped more tightly by such channels). Where there is more "pinch", it is less likely that the bag or net will "slip" from under the pinch, and therefore the net will stay in its functional position on the frame. Where the channel does not pinch sufficiently, however (such as along straighter portions of the frame), the anti-slip members (such as the parallel strips of hook and loop fabric) are preferably located (because those are areas where the fabric is more likely to slip and become disengaged from the frame).

Another benefit can be realized from the invention by locating the anti-slip means on the bag so that they provide an indication of the desired orientation of the bag on the frame. Frames come in various shapes, and bags can be fabricated to fit the frame in a certain orientation. By way of example, but not by way of limitation, certain frames are generally oval, with an attachment member (for attachment to an extendible pole or handle) centered on one of the "long" sides of the oval. Nets for such frames commonly include a seam (or are otherwise fabricated and shaped) so that the bag works much better if the seam is aligned with the longer axis of the oval. By providing snaps or Velcro fasteners on the bag or net at the location on either side of the attachment means (when the bag is oriented properly), those fasteners can serve to assist the user in placing the bag in its proper position. In other words, if the user knows that the attachment post is supposed to be between the two fasteners on the bag, the user can easily see the fasteners and orient the bag properly as the user is assembling the bag on the frame.

It is yet another object of my invention to provide anti-slip devices which prevent the fabric of a bag on a pool rake from slipping between the retaining means and the frame means by creating a mechanical obstacle to prevent the edge of the bag from moving between the frame means and the retaining means or by increasing friction between the bag and the frame means or the retaining means. These anti-slip devices are preferably formed by attaching a strip of fabric, rubberized fabric, rubber, plastic, or other suitable material along a designated length of the edge of the bag or along the entire perimeter of the mouth of the bag. Alternative embodiments include, without limitation, providing a rolled or folded hem at the bag's edge.

Another object of my invention is to provide an improved tool for cleaning debris from swimming pools, including the combination of frame means forming a mouth portion and net means covering the mouth portion, with retaining means for retaining the net means in operative relationship with the frame means. In the preferred embodiment, the retaining means has a first portion that extends from the frame means when the retaining means is operably assembled with the frame and net. That first portion of the retaining means includes a front surface with a first edge configured to contact a surface of the pool and a second edge positioned rearwardly with respect to the first edge as the tool is normally moved through the pool water. The second edge is positioned inwardly from the first edge with respect to the mouth of the frame, and the front surface constitutes a smooth transition between the first and second edges. Thus, the front surface and the first and second edges are configured to scoop debris from the pool surface and direct it away from the first edge and toward the second edge, and thereafter into the net means.

Another object of my invention is the provision of a tool of the aforementioned character, in which the retaining means is fabricated from a flexible, resilient material, in a generally U-shaped cross-section. Among other things, the shape memory of the material permits the leg portions (or one of them) to be temporarily and readily deformed to release the clip or retaining means from the frame and thereby permit the net to be replaced, initially assembled, and/or reassembled.

To assist in this operation, preferably at least the one aforementioned leg portion further includes gripping means to permit a user to readily grip and manipulate the leg portion and a corresponding detent means to and from the normally engaged relationship with respect to the frame means, to accomplish the aforesaid engagement and disengagement. The gripping means preferably includes a grippable portion extending outwardly from the frame means beyond a plane defined by the outer surface of the at least one leg portion.

Yet another object of my invention is the provision of a tool of the aforementioned character in which the frame means is fabricated from metal or plastic and includes an elongated, curved frame portion, and the frame portion has first and second ends welded or bonded to a tubular attachment means, with the welding or bonding occurring over a sufficient area to provide improved strength in comparison to prior art devices. The attachment means is preferably configured conventionally, to permit attachment of the tool to handle or pole means.

Still another object of my invention is the provision of an improved retaining device for retaining a net on a frame whereby the assembled net, frame and retaining device may be utilized to clean debris from swimming pools. The preferred retaining device includes an elongated body with a substantially U-shaped cross-section, the cross-section including a central web and leg portions extending therefrom. The interior surfaces of the web and the leg portions are configured to grippingly engage and retain the net on the frame when the device is operatively assembled therewith. The web means has an exterior surface defined by a first edge and a second edge, and the first and second edges and the exterior surfaces are preferably configured to form a smoothly sloping surface. This smooth, uninterrupted slope permits the assembled net, frame and retaining device to be moved through the swimming pool and to urge any debris away from the first edge and toward the second edge, and thereafter into the net.

An additional object of my invention is the provision of an improved retaining device of the aforementioned character, in which the leg portions are fabricated from a flexible, resilient material and include detent means for engaging the frame when the leg portions are in their normal unflexed configuration, the leg portions further include gripping means to permit a user to grip and manipulate the leg portion (or portions) and its corresponding detent means to and from its normal position to permit engagement and/or disengagement of the retaining means with or from the frame.

Other objects and advantages of the invention will be apparent from the following specification and the accompanying drawings, which are for the purpose of illustration only.

BRIEF DESCRIPTION OF THE DRAWINGS

FIG. 1 is a plan view of a preferred embodiment of frame means constructed in accordance with the teachings of the invention;

FIG. 2 is a plan view similar to FIG. 1, but showing a preferred assembly of net means and retaining means with the frame means;

FIG. 3 is a sectional view taken along line 3—3 of FIG. 2;

FIG. 4 is a sectional view taken along line 4—4 of FIG. 2, illustrating among other things a preferred embodiment of the retaining means of the invention;

FIG. 14 is an end view of a preferred embodiment of a bag constructed in accordance with the teachings of the invention, in the process of being assembled onto a frame and attachment means;

FIG. 15 is a sectional view taken along line 15—15 of FIG. 14, illustrating a preferred embodiment of the edge of the bag prior to folding around a portion of the frame means;

FIG. 15a is a sectional view similar to that of FIG. 4, but illustrating the edge of the bag after it has been assembled with frame means and retaining means;

FIG. 22 is a perspective view similar to FIG. 16, but illustrating an alternative embodiment of the bag showing snap-type anti-slip elements similar to those of FIG. 21;

FIG. 23 is a sectional view similar to that of FIG. 15a, but illustrating how the alternative embodiment of FIG. 22 might appear after the snap elements have been assembled with frame means and retaining means;

FIGS. 24 and 25 illustrate some of the many possible alternative embodiments of anti-slip devices which can snap or clamp together to assist in holding designated areas of the bag around the frame;

FIG. 26 is a sectional view similar to that of FIG. 15a, illustrating an alternative embodiment of the bag using anti-slip devices similar to that illustrated in FIG. 24 to assist in holding designated areas of the bag around the frame;

FIG. 27 is a sectional view similar to 15a, but illustrating an alternative embodiment in which an anti-slip device similar to that shown in FIG. 24 is assembled around the frame means and bag member, which can render the pool rake usable even if no retaining clip is utilized;

DESCRIPTION OF PREFERRED EMBODIMENT

Figure 1A:
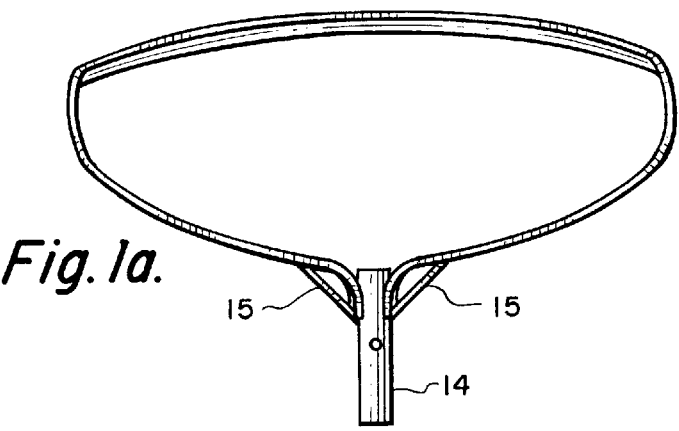
FIGS. 1a and 1b are plan views similar to FIG. 1, illustrating some of the alternative embodiments of the frame means of FIG. 1.

Referring now to the drawings, and particularly to FIGS. 1–4 thereof, I show a preferred embodiment of a swimming pool cleaning tool 10 including a preferred retaining means 20. In FIGS. 14, 15, and 15a, and as discussed more thoroughly below, I show a preferred bag member 100.

The tool 10 includes preferred frame means 12 forming a mouth portion 6, FIG. 1, preferably having conventional attachment means 14 and an elongated frame member 16 with its ends 18 and 19 welded to the attachment means 14. In the preferred embodiment, the frame means is fabricated from stainless steel or aluminum or other suitably strong, lightweight, cost-effective material. FIGS. 1a and 1b illustrate some of the many alternative embodiments of frame means 12, including the use of bracing members 15 and 17, also preferably of metal and welded to improve the strength and durability of the frame means 12.

Persons of ordinary skill in the art will understand that, although the attachment means 14 itself is conventional (in that it is preferably tubular with a conventional internal spring-action engagement member to engage a pole or handle, not shown), the preferred affixation of the ends 18 and 19 to the attachment means 14 is not conventional.

Among other things, and as indicated above, that affixation makes the tool 10 more durable than prior art devices. During use of this type of tool, various stresses can be concentrated in the neck portion (such as where the ends 18 and 19 join the attachment means 14). As indicated above, prior art devices are not sufficiently durable at this stress area, and repeated use of such prior art devices can fatigue the joint and/or materials thereabout, resulting in catastrophic failure and consequent damages and costs.

The preferred embodiment of the invention, in contrast, includes an expanded (in contrast with prior art devices) area of contact 13, FIG. 3, between the attachment means 14 and the two ends 18 and 19 of elongated frame member 16. Preferably, most if not all of this expanded area of contact 13 is used to weld, bond, glue or otherwise affix the ends 18 and 19 to the attachment means 14, thereby spreading the stress forces over a greater area and reducing the concentration and consequent risk of damage from those forces. It appears that, for non-welded embodiments, the ends 18 and 19 should preferably be in confronting relationship along a sufficient length of the attachment means 14 to provide a strong, durable affixation, with the ends being bonded or otherwise affixed thereto along substantially all of the length of the confronting relationship.

The preferred choice of welding the ends 18 and 19 to the attachment means 14 also enhances the durability of the tool 10 as compared to non-welded prior art devices, regardless of the relative size of the contact area 13.

Figure 1B:
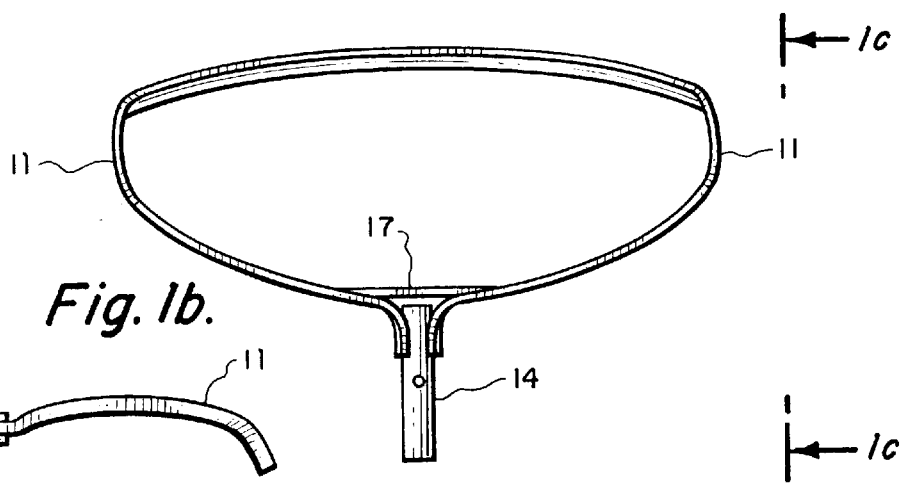
Figure 1C:
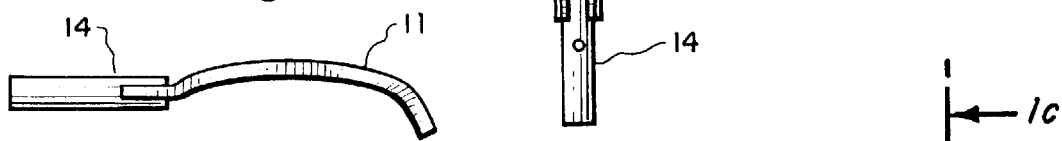
FIG. 1c is a side elevation view taken along line 1c—1c of FIG. 1b.
Figure 1D:
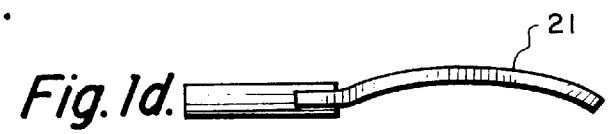
FIG. 1d is a side elevation view similar to FIG. 1c, but illustrating an alternative embodiment of the invention.

Among the many alternative embodiments of frame means 12 are embodiments such as FIGS. 1a and 1b, which include the use of bracing members 15 and 17 to additionally or alternatively reduce the stress concentration in the neck area.

The usability and effectiveness of the tool 10 is enhanced by providing the frame means 12 with certain non-planar bends and curvatures, such as in the shapes and configurations illustrated in FIGS. 1 and/or 1b and 1c. As best shown in FIG. 1, the outer shape of the flame means 12 includes curved corners and smoothly curved sides therebetween. The relatively smooth exterior shape provided by the preferred frame means 12 permits users to more effectively clean debris from curved surfaces of swimming pools. Prior art devices having straight sides and/or sharp corners are less effective in this regard, and can even puncture or otherwise damage pool liners if not used carefully.

Other beneficial preferred curvatures include biasing outwardly and/or downwardly and/or upwardly the outermost edge 7 of the frame means 12. Examples of these curvatures are best illustrated in FIGS. 1 and 2 (outwardly), and 1c, 10 and 11 (downwardly). Other curvatures with similar benefits include biasing or providing the outer side edges 11, FIGS. 1b and 1c, upwardly. One of the similar alternative embodiments in this regard is illustrated as side edges 21, FIG. 1d.

In other words, the preferred frame means includes an elongated, curved frame portion operatively affixed to tubular attachment means 14, where the tubular attachment means has a central longitudinal axis (parallel to the line 3—3 in FIG. 2) and one or more of the outermost edge and side edges of the frame portion are not located in a flat plane. The flat plane relevant to the preferred embodiment is a plane that includes the longitudinal axis of the attachment means 14 and is tangent to the frame portion at its location of affixation to the attachment means 14.

As mentioned above, these curvatures can make it easier for a user to clean certain areas and/or surfaces of pools, especially curved areas and/or surfaces. In addition, curvatures such as those discussed in the preceding paragraph can improve the performance, flexibility of application, and/or durability of the device of my invention. Among other things, the "memory" of the material from which the preferred embodiment of the frame is fabricated is such to allow the frame to flex temporarily when sufficient force is exerted thereon during use. This flexure improves the conformance of the shape of the tool 10 to the pool surface being cleaned, and thereby improves the ease of use and effectiveness of the user's cleaning efforts. After release of such force, the preferred frame material and/or shape cause the frame to snap back to its original configuration.

By way of example, even though it preferably is provided in a curved configuration, the preferred frame means 12 is also useful for cleaning pool surfaces that are flat, in that the frame is preferably provided in a material and dimension that permits some deflection of the curved sides upon the application of pressure. Specifically by way of example, a user might place the front edge 7, FIG. 1, against the flat bottom of a pool and exert force against the bottom (such as along the longitudinal axis of the attachment tube means 14), temporarily flattening or bending the front edge 7 into a more nearly straight line. This temporary flattening and/or bending can occur in one or more planes simultaneously, such as deforming the edge 7 toward the attachment means 14, FIG. 1, and deforming it in a direction perpendicular with respect to a central longitudinal axis of the tubular attachment means 14 (upwardly as shown in FIG. 3).

Even where the particular pool surface to be cleaned is not flat but is also not the precise curvature of the undistorted frame means 12, a preferred technique or method such as the foregoing can be utilized with the preferred frame to cause the front edge 7 or other edge of the tool 10 to approximate or conform to the curvature of the pool surface.

Once the frame has been pressed into approximate conformance with the surface to be cleaned, the tool is preferably pushed across that surface. Debris which may be located upon that surface is urged into the tool means 10 for removal from the pool, as more thoroughly described below. If the curvature of the pool surfaces varies at different locations within the pool, the memory and flexibility of the frame means 12 preferably causes and permits those portions of the elongated frame member 16 that are in contact with the pool surface to conform to those variations as the tool 10 passes over them, thereby enhancing the cleaning on all surfaces of the pool.

As indicated above, the outer side edges (such as edges 11) of the frame means 12 may be provided so that they are smoothly bent out of planar alignment with the remainder of the frame member 16. The aforementioned preferred flexibility and memory of the frame member 16 has a similar use and benefit to that described above, enabling the tool 10 to be used for a wide variety of surfaces, whether curved, flat, or undulating.

As indicated above, after the user releases the pressure that has temporarily deformed the frame means 12, it preferably returns to its original shape (this is caused by the material memory, as indicated above). In this regard, prior art devices leave much to be desired. Those of which the applicant is aware are either so stiff that they can break when force is applied as described above, or do not have the requisite "memory" (this means that they tend to retain their deformed shape instead of returning to their "memorized" original shape upon release of the aforesaid force).

The particular materials and dimensions of the frame means 12 can be readily determined without undo experimentation for any particular size of tool 10, by persons of ordinary skill in the art. In addition to the preferred stainless steel material, the frame means 12 can be fabricated from aluminum, plastic, or similar lightweight, flexible, resilient material.

The effectiveness of debris collection is further preferably improved by the provision of the front edge 7 of the frame member 16 in an angled or twisted configuration, such as best illustrated in FIG. 3. Rather than providing the front edge in parallel alignment with the back edge, it is preferably twisted so that its leading edge 9 (as the tool 10 is pushed through the water during use) is relatively farther away from the attachment means 14 than is the trailing edge 5. As described more thoroughly below, this enhances the contact between the leading edge of the tool 10 and the swimming pool surface with which it is in contact.

Thus, the preferred flexibility and configuration of the frame member 16 improve the ability of the tool 10 to intimately contact and clean the various (and potentially curved) surfaces of any particular swimming pool.

In the preferred embodiment, the mouth portion 6, FIG. 1, is covered by net means 40, such as a net member 42. Although the net member 42 can be beneficially used in connection with the invention, further details of the preferred net means are illustrated in FIGS. 14–29, as discussed more thoroughly below. The net member 42 is fabricated from any appropriate material, and is sized and configured to correspond with the opening 6 and to be able to retain a desired quantity of debris which may be collected in the net during use of the tool 10.

The net member 42 is preferably of conventional materials and construction and is preferably configured as a bag with an opening at one end. The net is assembled with the frame means 12 by laying the edge 44 of that opening over the frame means 12, preferably with the edge 44 being positioned on the relative outside of the frame means 12, FIG. 4. This positioning enhances the ease of removal of the debris from the net after collection thereof, because the debris does not get "hung up" on the lip or edge 44 of the net.

The net means 40 is preferably held or retained in operative relationship with the frame means 12 by retaining means 20 such as an elongated channel or strip 22, as best illustrated in FIG. 4. The strip 22 is preferably fabricated from plastic (such as polypropylene, polyethylene, butyrate, or the like) or other suitably tough, flexible, resilient, lightweight material having sufficient shape-memory to be snapped onto, and removed from, the frame means 12 as described herein. The channel or strip 22 is preferably in a generally U-shaped cross-section.

Although plastic U-shaped retaining channels or strips have been utilized in prior art devices, the present invention provides numerous advantages over any such prior art.

Among other things, the preferred embodiment of the retaining means 20 includes a first portion 24 extending from the frame means 12 when the retaining means 20 is operably assembled with the frame means 12. The first portion 24 includes a front surface 26 defined in part by a first or leading edge 28 which preferably contacts the surface of the pool which is to be cleaned. The first portion 24 also includes a second or trailing edge 30 positioned rearwardly with respect to the first edge 28 as the tool 10 is normally moved through the pool water. The front surface 26 is also defined in part by the second or trailing edge 30.

In the preferred embodiment, the second edge 30 is positioned inwardly from tile first edge 28 with respect to the mouth 6 of the frame. The front surface 26 constitutes a smooth transition between the first and second edges 28 and 30, and the front surface 26 and the first and second edges are configured to scoop debris from the pool surface and direct it away from the first edge 28 and toward the second edge 30, and thereafter into the net means 40.

The retaining means 20 of my invention provides easier removal and assembly with respect to the frame means 12 and net means 40, than is possible with prior art devices. The preferred U-shaped cross-section includes a central web 31 and leg portions 32 and 34 extending therefrom in confronting contact with opposing surfaces of the frame means 12 (actually, in direct contact with the net means 40 between the frame means 12 and the leg portion 32 or 34). Each of the leg portions 32 and 34 preferably includes outer surfaces 36 and 38, and at least one of the leg portions 32 or 34 includes detent means 50 such as an engaging bead 52 for engaging the frame means 12 when the respective leg portions 32 and/or 34 are in their normal unflexed configuration assembled with the frame means 12 such as elongated frame member 16, FIG. 4.

The surfaces 36 and 38 are preferably tapered inwardly (as shown in FIG. 4), but could be tapered outwardly or be in any of a wide variety of other configurations.

The leg portion 32 and/or 34 having the detent means 50 also preferably includes gripping means 54 such as a tab extension 56, to permit a user to grip and manipulate the respective leg portion and its corresponding detent means 50 from the normally engaged relationship with respect to the frame means 12. This permits the user to readily engage and disengage the retaining means 20 with and from the frame means 12, and thereby replace the net, the retaining means or make other indicated repairs or corrections. In the preferred embodiment, the gripping means 54 such as grippable tab portion 56 extends outwardly from the frame means 12 beyond a plane defined by the respective outer surface 36 or 38 of the leg portion 32 or 34.

To facilitate the bending of the retaining means 20 about the curved periphery of the frame means 12 (and to permit the channel to be used on a wide variety of shapes of frame means 12), a plurality of slots or grooves or serrations 58 is preferably provided about one of the legs 32 or 34. These slots 58 are shown in FIGS. 2 and 3 as positioned on the interior of the frame mouth 6, but the slots could be utilized with efficacy by positioning them on the outside of the frame means 12. Alternative embodiments, not shown, would include (by way of example) those having no slots 58, slots at varying distances and/or angles along the length of the retaining means, etc.

Persons of ordinary skill in the art will understand that the invention could be practiced by utilizing a plurality of strips such as strip 22 in end-to-end, abutting relationship with each other about the length of the frame member 16 (instead of using a single elongated strip as shown. In certain embodiments (as discussed more thoroughly below), a plurality of the strips or their equivalent can be spaced from each other about the length of the frame member, to beneficially retain the net in assembly on the frame.

Additionally, one of the many alternative embodiments of tile invention (not shown) includes no detent means 50 on the leg portion with slots 58 (and no gripping means 54 on that leg portion either). This permits the channel 22 to be removed from the frame means 12 by gripping and moving only one of the leg portions instead of both. Moreover, having that one leg portion be the non-slotted leg portion avoids the need to unhook all of the slotted portions from the frame means.

Those of ordinary skill in the art will also understand that the aforementioned inventive retaining device may be utilized with prior art frame members, and that the frame means of my invention may be effectively utilized with prior art retaining devices.

Regarding the use of the inventive retaining device with prior art frame members, certain prior art assemblies provide nets or bags having a loop permanently formed about the mouth or edge of the bag (by sewing or the like). Typically, the frame in such prior art assemblies is not permanently affixed to the attachment means, but instead may be disassembled so that, among other things, the aforementioned "loop" of the bag can be fed over the frame, prior to the frame being reassembled with the attachment means. The loop thereby holds the bag onto the frame. By overfitting such prior art assemblies with my aforementioned inventive retaining device, certain of the benefits of that device (including, by way of example, urging debris into the net, and reducing wear on the "loop" portion of the bag) can be realized. The combination of the looped net on the frame, as well as the use of my aforementioned inventive retaining device, helps keep the net from undesirably slipping or pulling out of engagement with the frame, as discussed herein.

In addition, benefits of frame durability, reduced manufacturing costs, and the like can be realized by permanently affixing the ends of a frame to an attachment member after feeding a "permanent loop" onto the frame member, and the benefits of a replacable clip member can then be provided by assembly of a clip over the looped-on portions. Among other things, permanently sewn loops can be less expensive to manufacture than the VELCRO, snap, or other net embodiments discussed herein, and the product can therefore be priced lower for consumers.

Thus, the interior surfaces of the web 31 and the leg portions 32 and 34 are preferably configured to grippingly engage and retain the net means 40 on the frame means 12 when the retaining means 20 is operatively assembled about them. The exterior surface 26 of the web 31 is configured and positioned to form a smoothly sloping surface whereby, as the assembled net, frame and retaining device 20 is moved through a swimming pool, the targeted debris is urged into the net means 40.

Figure 5:
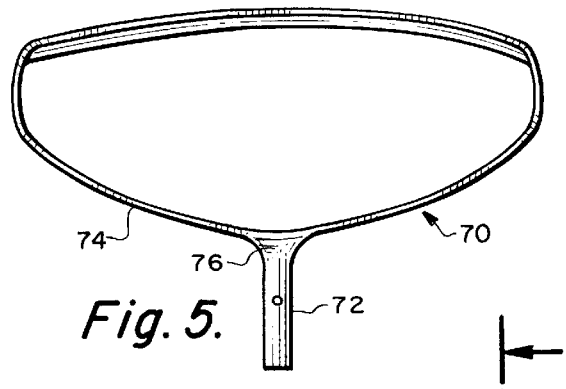
FIG. 5 is similar to FIG. 1, but illustrates another of the many alternative embodiments of the frame means of the invention.
Figure 7:
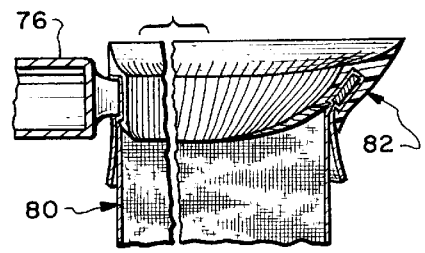
FIG. 7 is a broken sectional view taken along line 7—7 of FIG. 6, but illustrating shorter serrations or slots on one leg portion of the retaining means.
Figure 6:
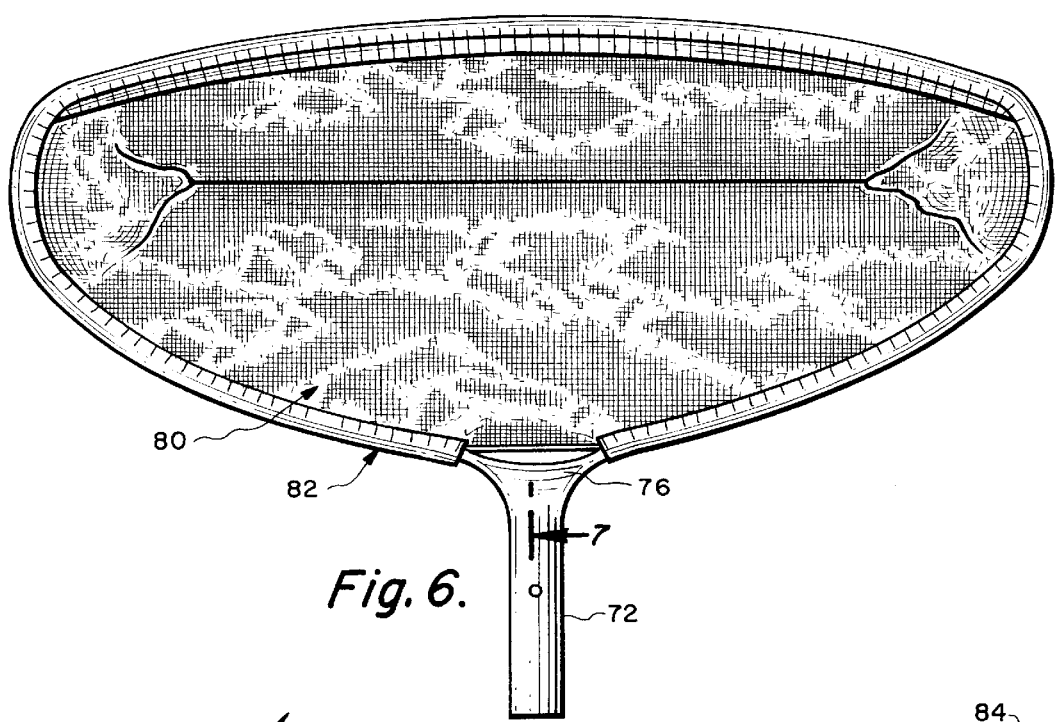
FIG. 6 is similar to FIG. 2, but illustrates the assembly of net means and retaining means with the frame means of FIG. 5.

Some of the many alternative embodiments of my invention are illustrated in FIGS. 5–7. Frame means 70, FIG. 5, is preferably formed or cast as a single unit (even from nylon or similar material) incorporating both an attachment section 72 and a rim portion 74 forming the mouth of the frame. The preferred dimensions and materials (especially those of neck portion 76) are such as to more effectively distribute the stresses that are exerted on the frame during use of the invention. FIG. 7 also illustrates an embodiment of shorter serrations or slots on one leg portion of the retaining means than shown in FIG. 6. The length of the serrations should be sufficient to permit the portions defined thereby to be readily flexed to permit engagement and disengagement with the frame means, but not so long as to make them incapable of exerting a desirable amount of gripping force on the frame means while engaged.

Other than the neck portion 76 related to the unitary nature of the frame means 70, the comments set forth above concerning the preferred embodiment of my invention apply to the alternative embodiment of FIGS. 5–7. For example, the net means 80 is similar to net means 40 of FIGS. 1–4 (or of FIGS. 14–29, as discussed below), and the retaining means 82 is similar to retaining means 20 of FIGS. 1–4.

Figure 8:
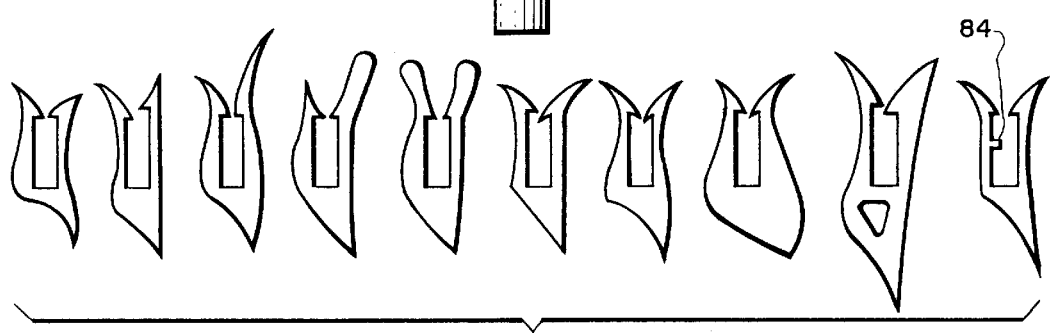
FIG. 8 illustrates some of the many alternative embodiments of cross-sections of the retaining means of the invention.

In FIG. 8, I illustrate cross-sections of some of the many alternative embodiments of retaining means such as retaining means 20 and 82. Among other things, these show alternative configurations of the smooth transition surface such as surface 26 to urge debris into the net means, and of the detent means and gripping means of my invention. In addition, the gripping action of the retaining means on the frame/net assembly can be enhanced by providing a groove or cavity in the frame means (not shown) and a correspondingly sized and positioned protruding portion such as portion 84, FIG. 8.

As indicated above, the gripping means of my invention provide an advance (among other advances) over the prior art known to me, with respect to assisting the user to engage and/or disengage the retaining means from the frame. The preferred gripping means makes it much easier to assemble and repair the tool 10 than was possible with prior art constructions.

Figure 9:
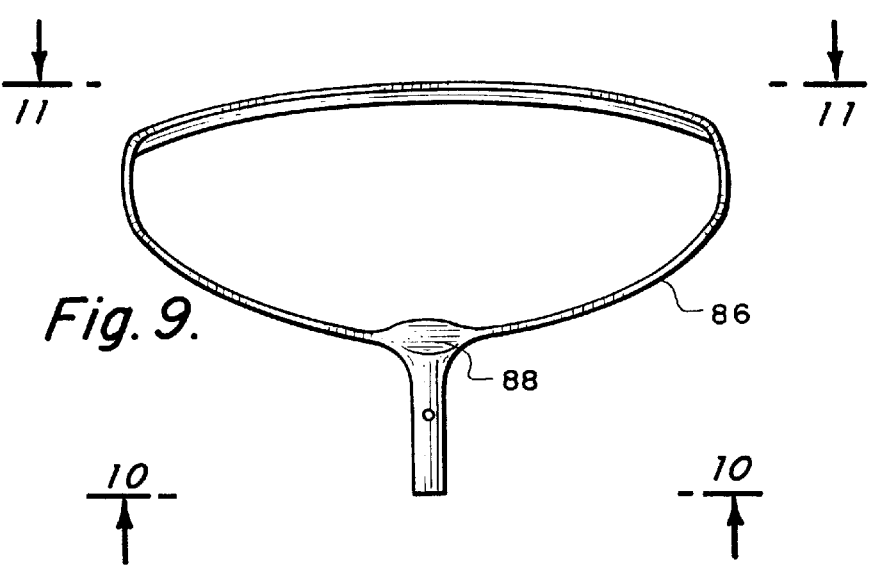
FIG. 9 is similar to FIG. 5, but illustrates another of the many alternative embodiments of the frame means of the invention.
Figure 10:
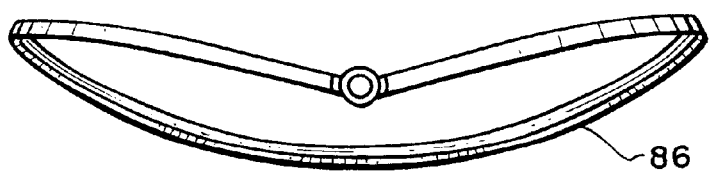
FIG. 10 is an end elevation view taken along line 10—10 of FIG. 1.
Figure 11:
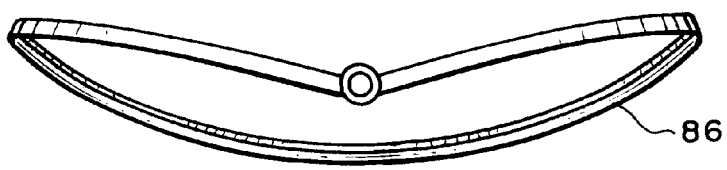
FIG. 11 is an end elevation view taken along line 11—11 of FIG. 9.
Figure 12:
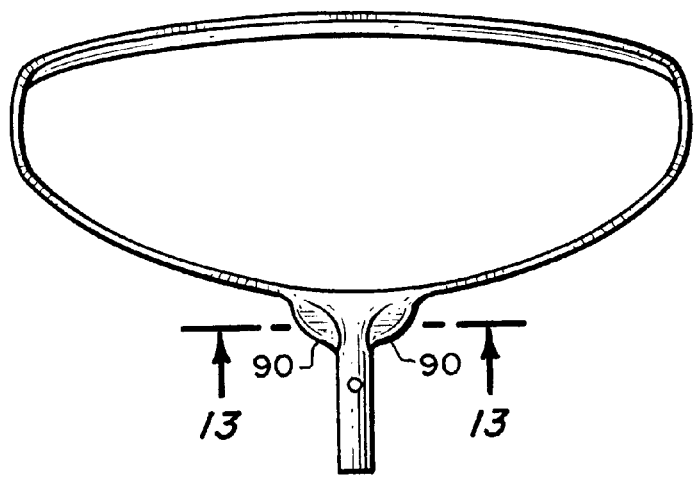
FIG. 12 is similar to FIG. 5, but illustrates yet another of the many alternative embodiments of the frame means of the invention.
Figure 13:
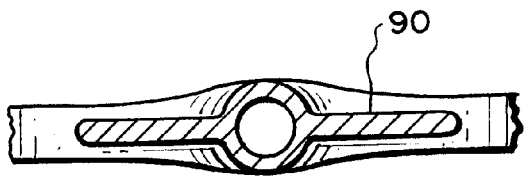
FIG. 13 is a sectional view taken along line 13—13 of FIG. 12.

Yet another of the many alternative embodiments of the frame means of my invention is illustrated as frame member 86, FIG. 9, which includes supporting web 88 for additional durability and strength. This and others of the illustrated and non-illustrated embodiments of my invention can include curvatures such as those illustrated in FIGS. 10 and 11, with beneficial functionality similar to that described above. Still another alternative embodiment, FIGS. 12 and 13, includes one or more supplemental side webs 90 for added strength and durability of the tool. These webs are shown as symmetrical, but alterative embodiments could include a wide range of shapes and sizes of webs and non-symmetrical arrangements. Embodiments such as FIGS. 9, 12 and 13 may be fabricated from plastic or other suitably strong, durable, flexible, resilient material.

Additional aspects of the net or bag means of my invention, as well as the method of my invention, are illustrated in FIGS. 14–29.

As shown in FIG. 14, the net or bag member 100 of my invention can be provided with anti-slip elements or means 102. In FIGS. 14, 15, and 15a, these are illustrated as cooperating VELCRO® hook 104 and loop 106 fasteners or the like. Persons of ordinary skill in the art will understand that a wide variety of anti-slip elements can be effectively utilized as part of my invention. For cooperating pairs of anti-slip elements such as fastener elements 104 and 106, persons of ordinary skill in the art will understand that these elements can be reversed (i.e., in FIG. 15, the hooks 104 could be located where the loops 106 are shown, and vice versa). These fasteners are preferably sewn or otherwise permanently attached to the bag member 100, and are preferably positioned to provide several benefits to my invention.

Among other things, the anti-slip elements 102 can help retain the net in its desired engagement with the frame member 108 (which frame member can be of any suitable character, including being similar to prior art frame members or the frame member of my invention, as discussed herein). As discussed elsewhere herein, in certain conditions and especially in certain areas about the mouth of an assembled net and frame (for example, where the net overlies the frame and is held in place thereon by a retaining clip or channel), the net can sometimes tend to slip from its desired engagement. By providing anti-slip elements 102 near an edge 105 of the bag 100, and especially by providing one or more cooperating pairs of such elements spaced from each other, the edge 105 can be folded around the frame 108 and engaged with the aforementioned cooperating element (such as engaging the loop 106 fasteners with the hook fasteners 104, FIGS. 15 and 15a). If desired, retaining means such as clip 110, FIG. 15a, can then be assembled over the net and frame, as discussed above. The debris from the pool water can then be effectively gathered in the main portion 101 of the bag or net.

The anti-slip elements can be positioned not only to help prevent the undesirable disengagement of the net from the frame, but to also help a user orient the net or bag 100 properly during replacement or initial assembly thereof. For example, in certain pool rake assemblies, the bag or net 100 is fabricated with a seam 112 or is otherwise configured so that it functions more effectively if the seam 112 is aligned in a particular orientation with respect to the attachment portion 114 or other element of the frame 108. Due to the folded or compressed condition in which replacement bags are commonly provided, it can be somewhat difficult for a user to properly orient the bag. By providing anti-slip elements 102 in the positions indicated in FIG. 14, a user can "straddle" the attachment member with the anti-slip elements 102 (that is, the user can place the attachment member 114 between the pairs of VELCRO fasteners 102). This provides ready visual orientation of the seam 112 with respect to the frame 108 that is lacking in prior art devices, and can, among other things, simplify and expedite the process of replacing and/or initially assembling a net on a frame.

Figure 14A:
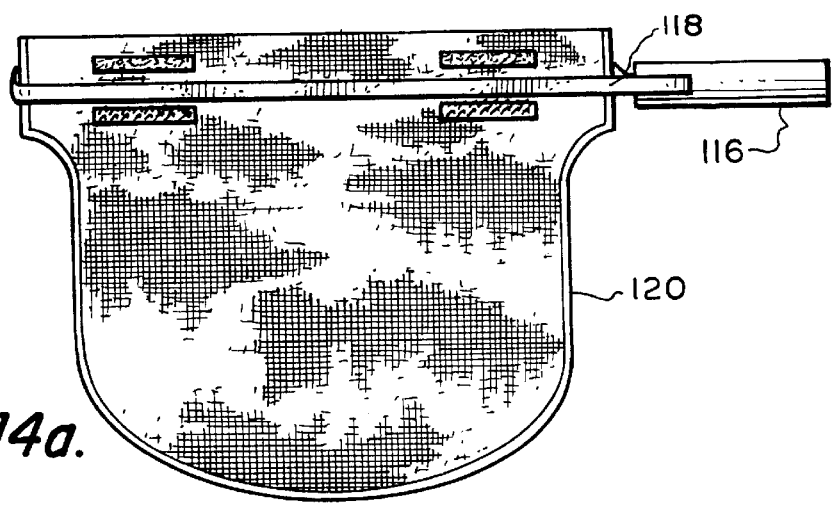
FIG. 14a is similar to FIG. 14, but illustrates a bag ready to be attached to a frame member, with a seam in the bag aligned with the attachment member of the frame means.

Persons of ordinary skill in the art will understand that certain benefits of the invention can be realized even when the seam is otherwise oriented, such as illustrated in FIG. 14a (showing an attachment means 116 on a frame member 118, with a bag 120).

Figure 16:
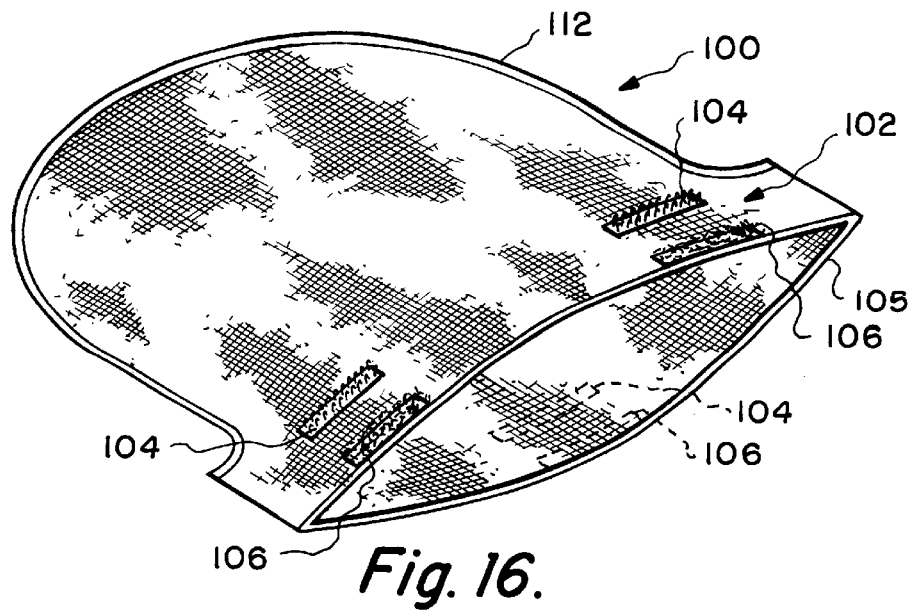
FIG. 16 is a perspective view of the bag of FIG. 14, but showing the bag separately from the frame and attachment means.
Figure 17:
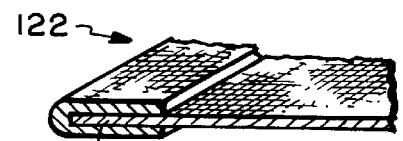
FIGS. 17–20 are partially sectional views of some of the many alternative embodiments of the edge of the bag or net of my invention, illustrating anti-slip members at the edge of the bag, which members may be fabricated from fabric (such as the bag folded back on itself, as in FIG. 19), rubberized fabric, rubber, plastic, or other suitable material.
Figure 20:
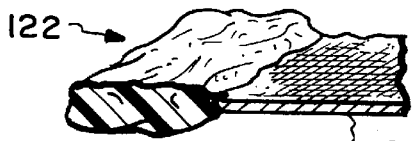
Figure 18:
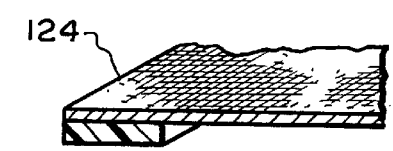

A preferred embodiment of the bag member 100 of FIGS. 14–15a is illustrated in FIG. 16, without any frame member 108 or retaining channel 110. Persons of ordinary skill in the art will understand that the anti-slip elements of my invention can be provided in a wide variety of positions, numbers, and forms about the mouth of the bag member. Although three cooperating pairs of fasteners 102 are shown in FIG. 16, any desirable number of fasteners may be provided about the net's mouth, including without limitation the substantially continuous antislip elements 121 illustrated in FIG. 28. Preferably, such a continuous band would include an interruption to accommodate the attachment means 116, and thereby also provide the "bag orientation" benefit discussed herein.

Figure 28:
FIG. 28 is similar to FIG. 16, but illustrates another of the many alternative embodiments of my invention, in which the anti-slip elements are provided as a continuous strip around the opening of the bag.

If the bag is provided with sufficient anti-slip elements about its mouth (such as, by way of example, the substantially continuous anti-slip elements 121 illustrated in FIG. 28), the aforementioned engagement of those elements about the frame member can be sufficient to retain the bag on the frame, even without a separate retaining channel such as retaining means 110, FIG. 15a. Among other things, such embodiments of my invention replace the aforementioned "loop-edged" bags of certain prior art devices, and eliminate the need to disassemble the aforementioned "disassemblable frames" of those devices because there is no need to "feed" the loop onto the frame.

Some of the many other alternative embodiments of the anti-slip elements or means 102 are illustrated in FIGS. 17–29.

Figure 29:
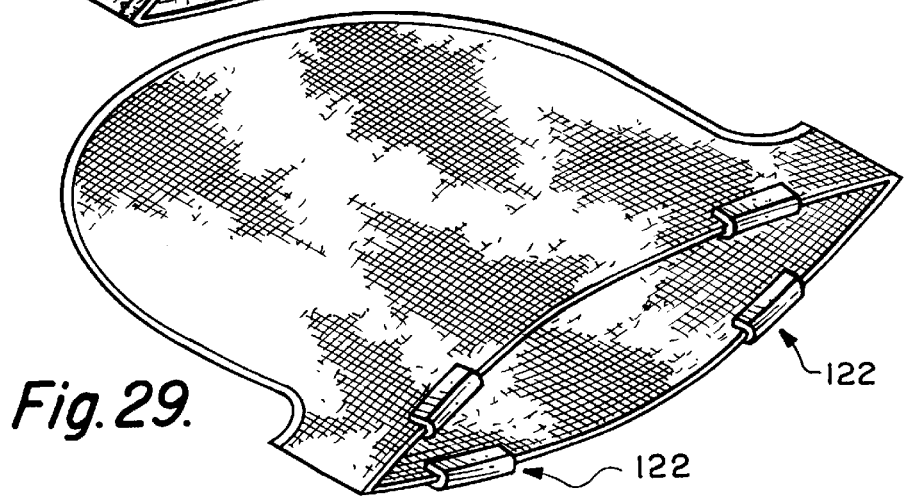
FIG. 29 is similar to FIGS. 16 and 28, but illustrates the use of alternative embodiments of the invention, such as, for example, discrete elements having a cross section similar to that shown in FIG. 17.
Figure 19:
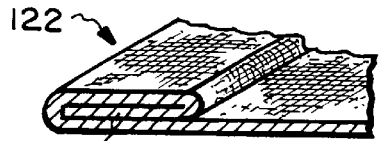

In the embodiments shown in FIGS. 17–20, 26 and 29, anti-slip means can include thickened portions 122, such as plastic, rubber, fabric or similar material affixed to the edge 124 in any suitable manner (see FIGS. 17, 18 and 20), including by gluing, bonding, dipping, heat-welding, or similar expedient. Again, these elements can be selectively positioned about the mouth of the bag in any desirable number, such as illustrated in FIG. 29, even to the point of being continuous about the mouth. In the embodiment of FIG. 19, the thickened portion 122 is illustrated as including the edge 124 of the bag being folded upon itself. Among other things, the folded edge 124 in FIG. 19 may be held in that folded configuration by sewing, heat-welding, or similar expedient.

Persons of ordinary skill in the art will understand that these thickened portions 122 can be effectively utilized in a wide variety of the embodiments discussed herein, although they are only shown in assembled form (with a frame member) in FIGS. 23, 26, and 29. In perhaps the simplest assembly, the folded edge 130, FIG. 23, could be provided without any snap member 132, and the thickened folded edge 130 would be less likely to slip from under the retaining channel 134 than a single-ply, non-thickened edge. Persons of ordinary skill in the art will similarly understand that any suitably thickened portion 122 (including by way of example and not by way of limitation, the embodiments of FIGS. 17–20) can provide the anti-slipping benefits of the invention when used in connection with a retaining means such as, for example, the retaining channel 134, FIG. 23.

Figure 21:
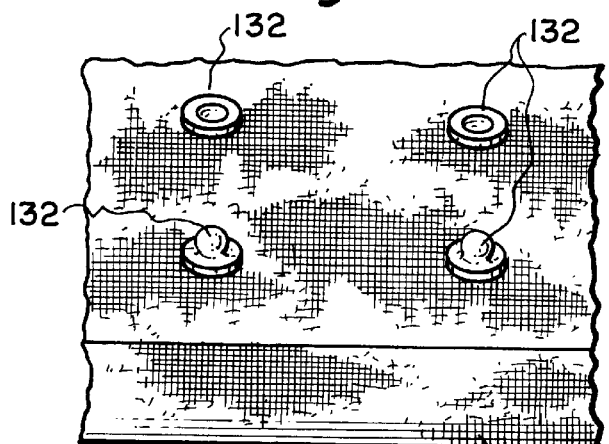
FIG. 21 is a partial perspective view of the edge of yet another alternative embodiment of the bag of my invention, illustrating anti-slip devices in the form of snaps that can be either permanently attachable or removable and replaceable.

In the embodiment of FIGS. 21–23, cooperating snap elements 132 can be provided similarly to the above-described VELCRO fasteners. The snap elements can be provided in any desirable number, and can be affixed to the bag or net in any suitable manner, including gluing, riveting, or the like. The location, use and method of assembly described for those VELCRO-type fastener embodiments applies equally to the snap assemblies illustrated in FIGS. 21–23.

Still more of the many alternative embodiments are shown in FIGS. 24–27. Independent snap elements 140 such as a single piece snap 142, FIG. 24, or cooperating snap portions 144 and 146 can be utilized, alone or in combination with other elements, as the anti-slip means of the invention. Persons of ordinary skill in the art will understand that, although the snaps 142 and 144/146 are each shown with two cooperating male and female portions, my invention can be practiced with a single male and female pair, or with more than two male and female pairs on each independent snap element 140.

Examples of the use of such independent snap elements 140 are shown in FIGS. 26 and 27 (persons of ordinary skill in the art will understand that a multi-piece snap such as 144 and 146 can be readily used in place of the illustrated single-piece element 142). In FIG. 26, the net 150 is laid over a frame 152, and a clip or snap such as snap 142 is used to "lock" the bag edge around the frame 152. Retaining means such as a channel 154 may also be used in the assembly, as further described herein.

In FIG. 27, the clip or snap 142 is configured to itself enwrap a frame member 156 with a bag or net 158 assembled thereon, and the snap 142 engaged to help keep the bag from disengaging from the frame. In embodiments where retaining means such as a channel 154 is used, the snap 142 may be most effectively positioned near the attachment means of the frame, beyond the ends of the retaining channel 154 (so that, as illustrated in FIG. 27, the clip or snap 142 does not enwrap the retaining channel 154). Persons of ordinary skill in the art will understand, however, that independent clamping devices or snap means 140 could be configured and positioned to "lock" the bag edge back onto the bag at any location about the mouth of the frame or bag, even locations in which a retaining channel such as channel 154 was present (the clamping device would have to be sufficiently large to enwrap the channel 154 also). As indicated above, if a sufficient number of snap elements 140 were utilized, they could themselves provide sufficient retention of the bag on the frame.

As indicated elsewhere herein, the anti-slip means of my invention can include a wide variety of combinations of elements, in addition to using one or more elements of a single type. Again by way of example and not by way of limitation, FIGS. 21 and 23 illustrate the use of cooperating snap members 132 and a thickened portion 130. VELCRO or similar strips can be interspersed with snap members about the bag's mouth, or any other desirable combination of anti-slip means can be utilized. FIG. 26 illustrates the use of a thickened portion 122 with an independent snap element 142.

Thus, the anti-slip means of my invention can thus be provided in a wide variety of forms and combinations of elements. By way of example and not by way of limitation, these include: (1) a bag laid across the frame means and wrapped therearound, with structure at the bag's edge thicker than the main body portion of the net, which thickened edge resists being pulled under a retaining strip assembled over the net edge and frame; and (2) a bag that is manually "looped" over the frame (as well as at least partially retained thereon) via Velcro strips, snaps, clamps, similar fasteners, or some combination thereof.

Thus, by my invention, I provide an improved method and apparatus for cleaning swimming pools, including the use of a durable, flexible, smoothly-contoured frame member, an improved replaceable net, and means for retaining a net on the frame which is readily engageable and removable and shaped to urge debris into the net.

The tool and method of my invention have been described with some particularity but the specific designs, constructions and steps disclosed are not to be taken as delimiting of the invention in that various modifications will at once make themselves apparent to those of ordinary skill in the art, all of which will not depart from the essence of the invention and all such changes and modifications are intended to be encompassed within the appended claims.

I claim:

1. In a tool for cleaning debris from swimming pools, the combination of: frame means forming a mouth portion; net means covering said mouth portion; and retaining means for retaining said net means in operative relationship with said frame means, said retaining means having a first portion extending from said frame means when said retaining means is operably assembled with said frame means, said first portion including a front surface having a first edge configured to contact a surface of the pool and a second edge positioned rearwardly with respect to said first edge as said tool is normally moved through the pool water, said second edge being positioned inwardly from said first edge with respect to said mouth of said frame means, said front surface constituting a smooth transition between said first and second edges, and said front surface and said first and second edges being configured to scoop debris from said pool surface and direct it away from said first edge and toward said second edge, and thereafter into said net means; said net means including a body portion which permits pool water to flow through but traps particulate materials, said body portion having an edge folded outwardly over said frame means, said edge including anti-slip means to assist in retaining said net means in operative relationship with said frame means; said frame means includes an elongated, curved frame portion, said frame portion being operatively affixed to tubular attachment means, said tubular attachment means having a central longitudinal axis, said frame portion further having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position.

2. The tool of claim 1, in which said retaining means is provided in a flexible, resilient material and in a generally U-shaped cross-section.

3. The tool of claim 2, in which said U-shaped cross-section includes leg portions in confronting contact with opposing surfaces of said frame means or said net means therebetween, each of said leg portions including outer surfaces, at least one of said leg portions including detent means for engaging said frame means when said leg portions are in their normal unflexed configuration, said at least one leg portion further including gripping means to assist a user to grip and manipulate said leg portion and its corresponding detent means from said normally engaged relationship with respect to said frame means to assist engagement and/or disengagement of said retaining means with and/or from said frame means, in which said gripping means includes a grippable portion extending outwardly from said frame means beyond a plane defined by said outer surface of said at least one leg portion.

4. The tool of claim 1 or claim 2 or claim 3, in which said frame means is fabricated from metal and includes an elongated, curved frame portion, said frame portion having first and second ends welded to tubular attachment means, said attachment means being configured to permit attachment of said tool to handle means.

5. The tool of claim 1 or claim 2 or claim 3, in which said frame means includes an elongated, curved frame portion, said frame portion having first and second ends in confronting relationship along a length of tubular attachment means, said first and second ends being operatively affixed thereto along substantially all of said length of confronting relationship, said tubular attachment means configured to permit attachment of said tool to handle means.

6. In a tool for cleaning debris from swimming pools, the combination of: frame means forming a mouth portion; net means covering said mouth portion; retaining means for retaining said net means in operative relationship with said frame means, said frame means including an elongated, curved frame portion, said frame portion being affixed to said tubular attachment means, said tubular attachment means having a central longitudinal axis, said frame means having a rear portion including said first and second ends, wherein said rear portion extends generally parallel to a first plane that is coincident with said longitudinal axis, said frame including a forward portion having a generally rectangular cross section wherein said forward portion includes a front edge constituting a major surface of said rectangular cross section of said frame member that faces outwardly away from said opening, a second plane coincident with said longitudinal axis and perpendicular to said first plane, wherein a plane coincident with said front edge forms an acute exterior angle with said first plane as viewed in a direction normal to said second plane when in an un-flexed position, said net means having an edge configured to overlay said frame means, said edge including anti-slip means to assist in retaining said net means in operative relationship with said frame means.

7. In a tool for cleaning debris from swimming pools, the combination of: frame means forming a mouth portion; said frame means including a substantially flat forward surface which is the leading surface of said frame means and being oriented at an angle to form said mouth portion as said frame means is normally moved through a swimming pool and further including an outer surface radially outward with respect to said mouth portion; net means for covering said mouth portion; and retaining means for retaining said net means in operative relationship with said frame means, said retaining means having a first portion extending from said frame means when said retaining means is operably assembled with said frame means, said first portion including a front surface having a first edge configured to contact a surface of the pool, said first edge located forward of said substantially flat forward surface of said frame means, and a second edge positioned rearwardly with respect to said first edge as said tool is normally moved through the pool water, said second edge being positioned inwardly from said first edge with respect to said mouth of said frame means, said front surface constituting a smooth transition between said first and second edges, and said front surface and said first and second edges being configured to scoop debris from said pool surface and direct it away from said first edge and toward said second edge, and thereafter into said net means; said net means including a body portion which permits pool water to flow through but traps particulate materials, said body portion having an edge configured to overlay said frame means, said edge including anti-slip means to assist in retaining said net means in operative relationship with said frame means.

8. The tool of claim 7, in which said retaining means is provided in a flexible, resilient material and in a generally U-shaped cross-section.

9. The tool of claim 8, in which said U-shaped cross-section includes leg portions having said frame means and said net means therebetween, each of said leg portions including outer surfaces forming respective planes, at least one of said leg portions including detent means for engaging said frame means when said leg portions are in their normal unflexed configuration, said at least one leg portion further including gripping means to assist a user to grip and manipulate said leg portion and its corresponding detent means from said normally engaged relationship with respect to said frame means to assist engagement, disengagement, or both engagement and disengagement of said retaining means with respect to said frame means, in which said gripping means includes a grippable portion extending from said frame means beyond said respective plane defined by said outer surface of said at least one leg portion.

10. The tool of claim 7 or claim 8 or claim 9, in which said frame means is fabricated from metal and includes an elongated, curved frame portion, said frame portion having first and second ends welded to tubular attachment means, said attachment means being configured to permit attachment of said tool to handle means.

11. The tool of claim 7 or claim 8 or claim 9, in which said frame means includes an elongated, curved frame portion, said frame portion having first and second ends in confronting relationship along a length of tubular attachment means, said first and second ends being operatively affixed thereto along substantially all of said length of confronting relationship, said tubular attachment means configured to permit attachment of said tool to handle means.

12. The tool of claim 7 or claim 8 or claim 9, in which said frame means includes an elongated, curved frame portion, said frame portion being operatively affixed to tubular attachment means, said tubular attachment means having a central longitudinal axis defining a flat plane tangent to said frame portion at said location of operative affixation of said frame portion to tubular attachment means, which flat plane includes said longitudinal axis, said frame portion further including an outermost edge and first and second side edges of said frame portion, in which one or more of said outermost, first and/or second side edges are not located in said flat plane.

* * * * *

UNITED STATES PATENT AND TRADEMARK OFFICE
CERTIFICATE OF CORRECTION

PATENT NO.    : 6,302,277 B1
DATED         : October 16, 2001
INVENTOR(S)   : Eric Resh It is certified that error appears in the above-identified patent and that said Letters Patent is hereby corrected as shown below:

<u>Title page,</u>
Item [57], ABSTRACT,
Line 2, "flame" should read -- frame --.

<u>Column 3,</u>
Line 46, "positions" should read -- portions --.

<u>Column 4,</u>
Line 10, "flame" should read -- frame --.

<u>Column 10,</u>
Line 3, "flame" should read -- frame --.

<u>Column 12,</u>
Line 30, "tile" should read -- the --.

<u>Column 13,</u>
Line 23, "tile" should read -- the --.

<u>Column 14,</u>
Line 60, "alterative" should read -- alternative --.

Signed and Sealed this

Twenty-second Day of October, 2002

Attest:

Attesting Officer

JAMES E. ROGAN
Director of the United States Patent and Trademark Office

UNITED STATES PATENT AND TRADEMARK OFFICE
CERTIFICATE OF CORRECTION

PATENT NO.     : 6,302,277 B1                                              Page 1 of 1
DATED          : October 16, 2001
INVENTOR(S)    : Eric Resh It is certified that error appears in the above-identified patent and that said Letters Patent is hereby corrected as shown below:

<u>Title page,</u>
Item [57], ABSTRACT,
Line 2, "flame" should read -- frame --.

<u>Column 3,</u>
Line 46, "positions" should read -- portions --.

<u>Column 4,</u>
Line 10, "flame" should read -- frame --.

<u>Column 10,</u>
Line 3, "flame" should read -- frame --.

<u>Column 12,</u>
Line 30, "tile" should read -- the --.

<u>Column 13,</u>
Line 23, "tile" should read -- the --.

<u>Column 14,</u>
Line 60, "alterative" should read -- alternative --.

Signed and Sealed this

Twenty-ninth Day of October, 2002

*Attest:*

*Attesting Officer*

JAMES E. ROGAN
*Director of the United States Patent and Trademark Office*